(12) United States Patent
Potts et al.

(10) Patent No.: US 9,977,565 B2
(45) Date of Patent: May 22, 2018

(54) INTERACTIVE EDUCATIONAL SYSTEM WITH LIGHT EMITTING CONTROLLER

(71) Applicant: LeapFrog Enterprises, Inc., Emeryville, CA (US)

(72) Inventors: Alex Potts, Oakland, CA (US); David Perkinson, San Anselmo, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 405 days.

(21) Appl. No.: 14/617,634

(22) Filed: Feb. 9, 2015

(65) Prior Publication Data

US 2016/0231896 A1    Aug. 11, 2016

(51) Int. Cl.

| | | |
|---|---|---|
| *G09G 5/00* | (2006.01) | |
| *G06F 3/0481* | (2013.01) | |
| *G06T 11/00* | (2006.01) | |
| *A63F 13/213* | (2014.01) | |
| *A63F 13/24* | (2014.01) | |
| *A63F 13/428* | (2014.01) | |
| *A63F 13/426* | (2014.01) | |

(52) U.S. Cl.
CPC ........ *G06F 3/04812* (2013.01); *A63F 13/213* (2014.09); *A63F 13/24* (2014.09); *A63F 13/426* (2014.09); *A63F 13/428* (2014.09); *G06T 11/001* (2013.01)

(58) Field of Classification Search
CPC .... A63F 13/213; A63F 13/426; A63F 13/428; G06F 3/04812; G06T 11/001
See application file for complete search history.

(56) References Cited

U.S. PATENT DOCUMENTS

| | | | |
|---|---|---|---|
| 5,638,116 A * | 6/1997 | Shimoura | G05D 1/0246 |
| | | | 348/118 |
| 6,072,467 A | 6/2000 | Walker | |
| 6,308,565 B1 | 10/2001 | French et al. | |
| 6,430,997 B1 | 8/2002 | French et al. | |
| 6,501,515 B1 | 12/2002 | Iwamura | |
| 6,749,432 B2 | 6/2004 | French et al. | |
| 6,765,726 B2 | 7/2004 | French et al. | |
| 6,771,277 B2 | 8/2004 | Ohba | |
| 6,876,496 B2 | 4/2005 | French et al. | |
| 7,352,359 B2 | 4/2008 | Zalewski et al. | |
| 7,359,121 B2 | 4/2008 | French et al. | |
| 7,414,611 B2 | 8/2008 | Liberty | |
| 7,424,388 B2 | 9/2008 | Sato | |
| 7,445,550 B2 | 11/2008 | Barney et al. | |
| 7,492,268 B2 | 2/2009 | Ferguson et al. | |
| 7,500,917 B2 | 3/2009 | Barney et al. | |

(Continued)

OTHER PUBLICATIONS

US 7,659,882, 02/2010, Zalewski et al. (withdrawn)

*Primary Examiner* — Justin Myhr
(74) *Attorney, Agent, or Firm* — Kilpatrick Townsend & Stockton LLP

(57) ABSTRACT

Once embodiment of the invention is directed to a method comprising receiving, at a computing device, image data from a camera, converting, by the computing device, the image data to a YUV color space, filtering, by the computing device, the converted image data based on intensity and a predetermined color to produce a filtered image, and determining, by the computing device, a location of light emitted from a controller from the filtered image.

19 Claims, 17 Drawing Sheets

(56) References Cited

U.S. PATENT DOCUMENTS

| | | |
|---|---|---|
| 7,627,139 B2 | 12/2009 | Marks et al. |
| 7,658,676 B2 | 2/2010 | Ohta |
| 7,668,340 B2 | 2/2010 | Cohen et al. |
| 7,698,096 B2 | 4/2010 | Ohta |
| 7,716,008 B2 | 5/2010 | Ohta |
| 7,737,944 B2 | 6/2010 | Harrison et al. |
| 7,782,297 B2 | 8/2010 | Zalewski et al. |
| 7,791,808 B2 | 9/2010 | French et al. |
| 7,823,089 B2 | 10/2010 | Wilson |
| 7,843,429 B2 | 11/2010 | Pryor |
| 7,850,527 B2 | 12/2010 | Barney et al. |
| 7,854,655 B2 | 12/2010 | Mao et al. |
| 7,896,742 B2 | 3/2011 | Weston et al. |
| 7,911,447 B2 | 3/2011 | Kouno |
| 7,918,733 B2 | 4/2011 | Zalewski et al. |
| 7,924,264 B2 | 4/2011 | Ohta |
| 7,952,483 B2 | 5/2011 | Ferguson et al. |
| 7,976,387 B2 | 7/2011 | Venkatesh et al. |
| 7,996,793 B2 | 8/2011 | Latta et al. |
| 8,000,924 B2 | 8/2011 | Sato et al. |
| 8,062,126 B2 | 11/2011 | Marks et al. |
| 8,068,096 B2 | 11/2011 | Taira et al. |
| 8,072,424 B2 | 12/2011 | Liberty |
| 8,089,458 B2 | 1/2012 | Barney et al. |
| 8,098,142 B2 * | 1/2012 | Schofield ............... B60N 2/002 340/425.5 |
| 8,111,239 B2 | 2/2012 | Pryor et al. |
| 8,132,126 B2 | 3/2012 | Wilson |
| 8,144,933 B2 | 3/2012 | Yamashita |
| 8,146,020 B2 | 3/2012 | Clarkson |
| 8,164,566 B2 | 4/2012 | Corson |
| 8,164,567 B1 | 4/2012 | Barney et al. |
| 8,165,345 B2 | 4/2012 | Chau |
| 8,169,406 B2 | 5/2012 | Barney et al. |
| 8,176,442 B2 | 5/2012 | Poot |
| 8,181,123 B2 | 5/2012 | Stone-Perez et al. |
| 8,184,097 B1 | 5/2012 | Barney et al. |
| 8,233,721 B2 | 7/2012 | Wagg |
| 8,237,655 B2 | 8/2012 | Yabe et al. |
| 8,237,656 B2 | 8/2012 | Hsu et al. |
| 8,248,367 B1 | 8/2012 | Barney et al. |
| 8,253,746 B2 | 8/2012 | Geisner et al. |
| 8,264,456 B2 | 9/2012 | Ito et al. |
| 8,277,316 B2 | 10/2012 | Haigh-Hutchinson |
| 8,284,157 B2 | 10/2012 | Markovic et al. |
| 8,296,151 B2 | 10/2012 | Klein et al. |
| 8,300,042 B2 | 10/2012 | Bell |
| 8,303,405 B2 | 11/2012 | Zalewski et al. |
| 8,310,656 B2 | 11/2012 | Zalewski |
| 8,331,619 B2 | 12/2012 | Ikenoue |
| 8,334,842 B2 | 12/2012 | Markovic et al. |
| 8,368,648 B2 | 2/2013 | Barney et al. |
| 8,418,085 B2 | 4/2013 | Snook et al. |
| 8,432,390 B2 | 4/2013 | Givon |
| 8,433,094 B1 | 4/2013 | Nguyen |
| 8,451,278 B2 | 5/2013 | Geisner et al. |
| 8,465,108 B2 | 6/2013 | Markovic et al. |
| 8,467,568 B2 | 6/2013 | Roberts et al. |
| 2002/0085097 A1 * | 7/2002 | Colmenarez .......... G06F 3/0304 348/211.4 |
| 2003/0174772 A1 * | 9/2003 | Voronov ................ H04N 5/144 375/240.06 |
| 2003/0194135 A1 * | 10/2003 | Wenzel .................... G06K 9/42 382/209 |
| 2004/0070564 A1 * | 4/2004 | Dawson ............... H04N 21/422 345/156 |
| 2004/0207597 A1 * | 10/2004 | Marks .................... G06F 3/017 345/156 |
| 2007/0071425 A1 * | 3/2007 | Horinouchi ............. A63F 13/08 396/54 |
| 2007/0117625 A1 * | 5/2007 | Marks .................... G06F 3/017 463/30 |
| 2009/0215495 A1 * | 8/2009 | Fahlgren ............. H04M 1/0247 455/566 |
| 2010/0149740 A1 * | 6/2010 | Cheng .................... A63F 13/06 361/679.4 |
| 2013/0241835 A1 * | 9/2013 | Lee ..................... G06F 3/03543 345/166 |
| 2013/0324254 A1 * | 12/2013 | Huang ................... G06F 3/016 463/37 |

\* cited by examiner

US 9,977,565 B2

INTERACTIVE EDUCATIONAL SYSTEM WITH LIGHT EMITTING CONTROLLER

BACKGROUND OF THE INVENTION

Existing gaming systems are generally too sophisticated for younger children to use (e.g., children aged three through seven). For example, younger children may not have the reading skills or motor skills to operate existing gaming systems easily or independently. Instead an adult or older child is required to help them set up, navigate, and play games. There is a need for a gaming system that accommodates for children who do not read or have only beginning reading skills and who are still developing finer motor skills.

Embodiments of the invention address these and other problems, individually and collectively.

BRIEF SUMMARY OF THE INVENTION

Embodiments of the invention are directed to systems, apparatuses, and methods for providing a gaming system and content that accommodates for children who do not read or have only beginning reading skills and who are still developing finer motor skills.

One embodiment of the invention is directed to a method comprising receiving, at a computing device, image data from a camera, converting, by the computing device, the image data to a YUV color space, filtering, by the computing device, the converted image data based on intensity and a predetermined color to produce a filtered image, and determining, by the computing device, a location of light emitted from a controller from the filtered image.

Another embodiment of the invention is directed to a method comprising receiving, at a computing device, image data from a camera, determining, by the computing device, a controller location from the image data, determining, by the computing device, the distance of the controller location to a plurality of registered hotspots, calculating, by the computing device, a pull amount for each hotspot, and moving, by the computing device, a display of a cursor to a correct hotspot position based on the pull amount.

Another embodiment of the invention is directed to a method comprising receiving, at a computer apparatus, image data from a camera, determining, by the computer apparatus, a location of movement of body motion of a first user based on the image data received from the camera, determining, by the computer apparatus, an object closest to the location of body motion of the first user, determining, by the computer apparatus, a direction of movement of the body motion of the first user, and causing, by the computer apparatus, the object to be moved on a display in the direction of the movement. The method may further comprise determining, from the image data, a location of light emitted from a controller used by a second user, determining the direction of movement of the light emitted from the controller, and causing an object associated with the second user to be moved on the display in the direction of the movement.

Another embodiment of the invention is directed to a method comprising receiving, at a computer apparatus, image data from a camera, determining, by the computer apparatus, that a user has completed a predetermined task, automatically causing the camera to take a photo of the user substantially simultaneously with the user completing the predetermined task.

Other embodiments of the invention are directed to systems and computer apparatuses to perform the methods describes above. These and other embodiments of the invention are described in further detail below.

DETAILED DESCRIPTION OF THE INVENTION

Embodiments of the invention provide a gaming system and content that accommodates for children who do not read or have only beginning reading skills and who are still developing finer motor skills.

Figure 1:
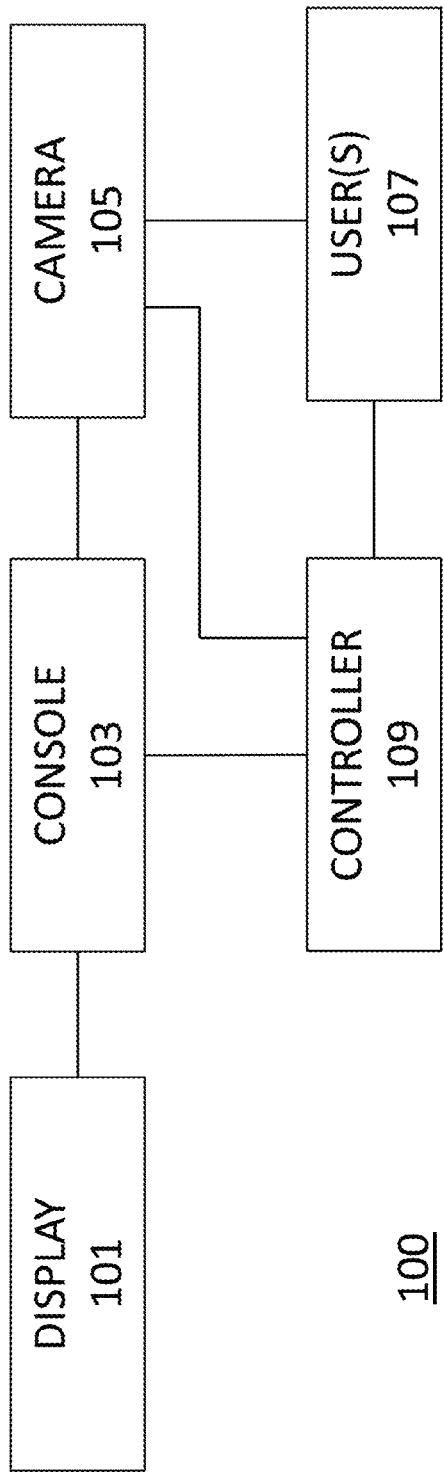
FIG. 1 shows an exemplary system that can be used in embodiments of the invention.

FIG. 1 shows an exemplary system 100 that can be used in embodiments of the invention. The system 100 includes a display 101 (e.g., a TV, a monitor, etc.) for displaying content to a user(s) 107 (e.g., an interactive game, a visual of the user, etc.). For example, the display 101 may have a screen to display content and also input and output interfaces to connect or be coupled with other components via wired (e.g., firewire, USB, Ethernet, etc.) or wireless (WiFi, Infrared, etc.) connections. The display 101 may be coupled with a console 103 (e.g., a gaming console). The console 103 may be coupled with a camera 105 that captures images and movement of the user(s) 107 and a light emitted from a controller 109. The console 103 may be further coupled with a controller 109. Components 101-109 may be coupled together by wired or wireless connections as known in the art.

Figure 2:
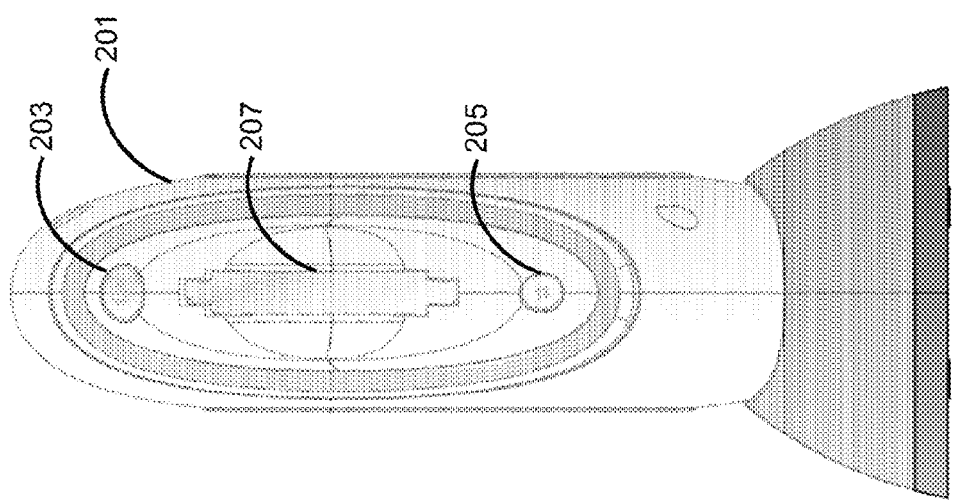
FIG. 2 shows an exemplary console that can be used in embodiments of the invention.

FIG. 2 shows an exemplary console 103 according to embodiments of the invention. The console 103 may have a housing 201. There may be a number of buttons or controls on the housing 201. For example, there may be a power button 203 and a sync button 205 on the housing 201. The console 103 may also have a slot 207 to accept a game cartridge or other medium for a game or content to use within a gaming system.

Returning to FIG. 1, the console 103 may have input and output interfaces to be coupled with other components via wired (e.g., firewire, USB, Ethernet, etc.) or wireless (WiFi, Infrared, etc.) connections. For example, the console 103 may be coupled with the camera 105. The console 103 may receive image data from the camera 105 and use the image data to provide content on a display 101. For example, the console 103 may receive image data of a user(s) 107 interacting with content that is already displayed on a display 101. The console 103 may utilize the image data to cause images to display on the display 101 so that the user(s) 107 may see himself or herself interacting with the content on the display 101.

Figure 3:
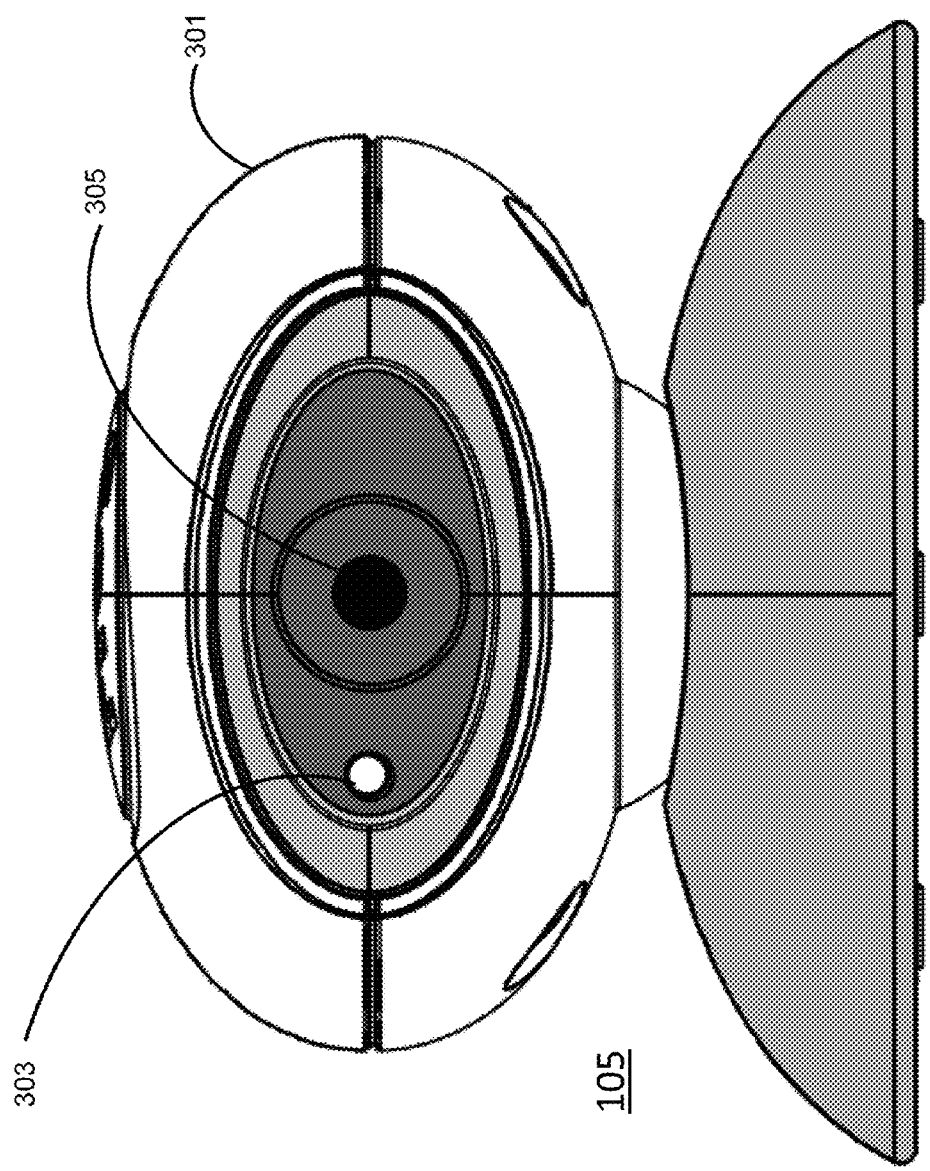
FIG. 3 shows an exemplary camera that can be used in embodiments of the invention.

FIG. 3 shows an exemplary camera 105 according to embodiments of the invention. The camera 105 may have a housing 301, a camera activity indicator 303, and a lens 305. The lens 305 may capture images of a user(s) 107, a light emitted from a controller 109, etc. As explained above, the camera 105 may be coupled with the console 103 to capture image data of a user(s) 107 interacting with content that is displayed on the display 101. The camera 105 may also capture still or video images of a user(s) 107 to be used in various current or future aspects of game play or badges or rewards for completing games or curriculum.

Figure 4A:
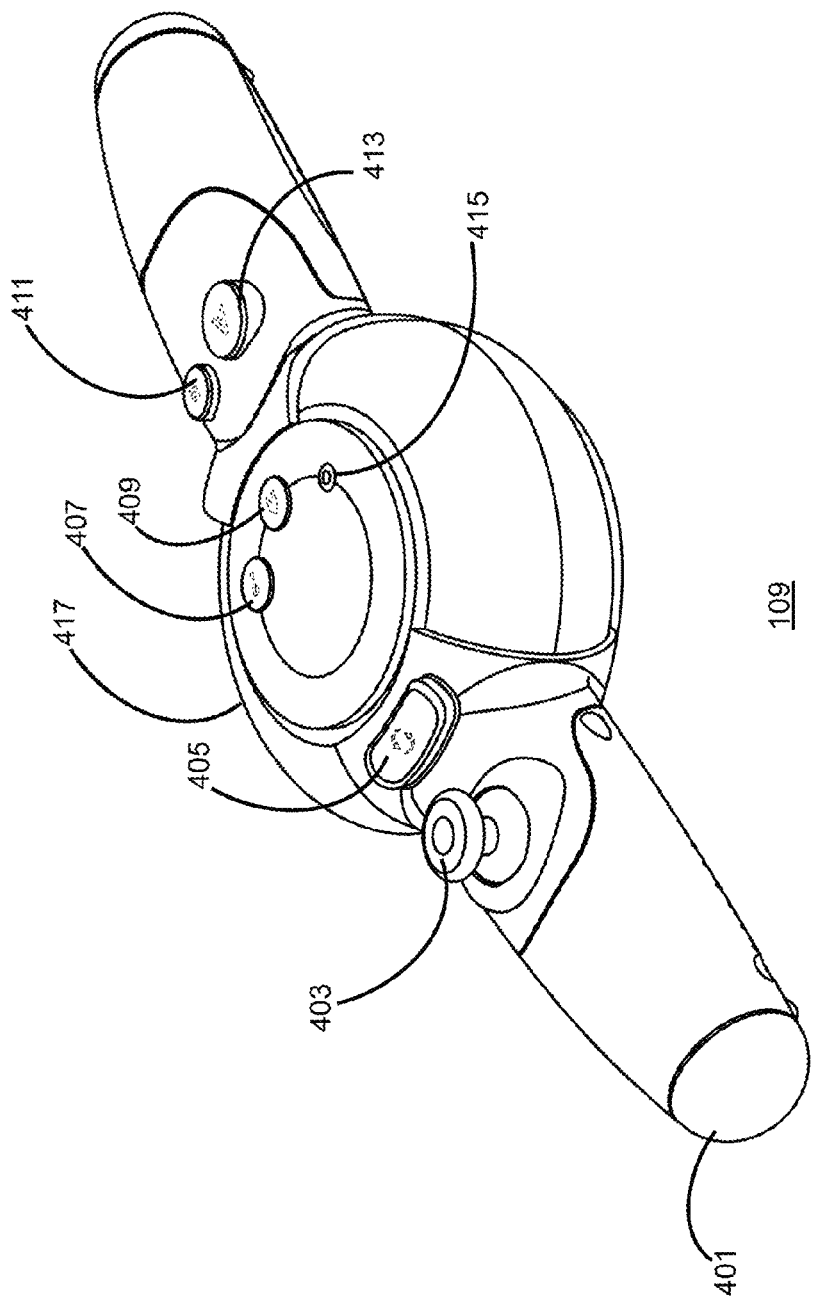
FIGS. 4A and 4B shows an exemplary controller that can be used in embodiments of the invention.
Figure 4B:
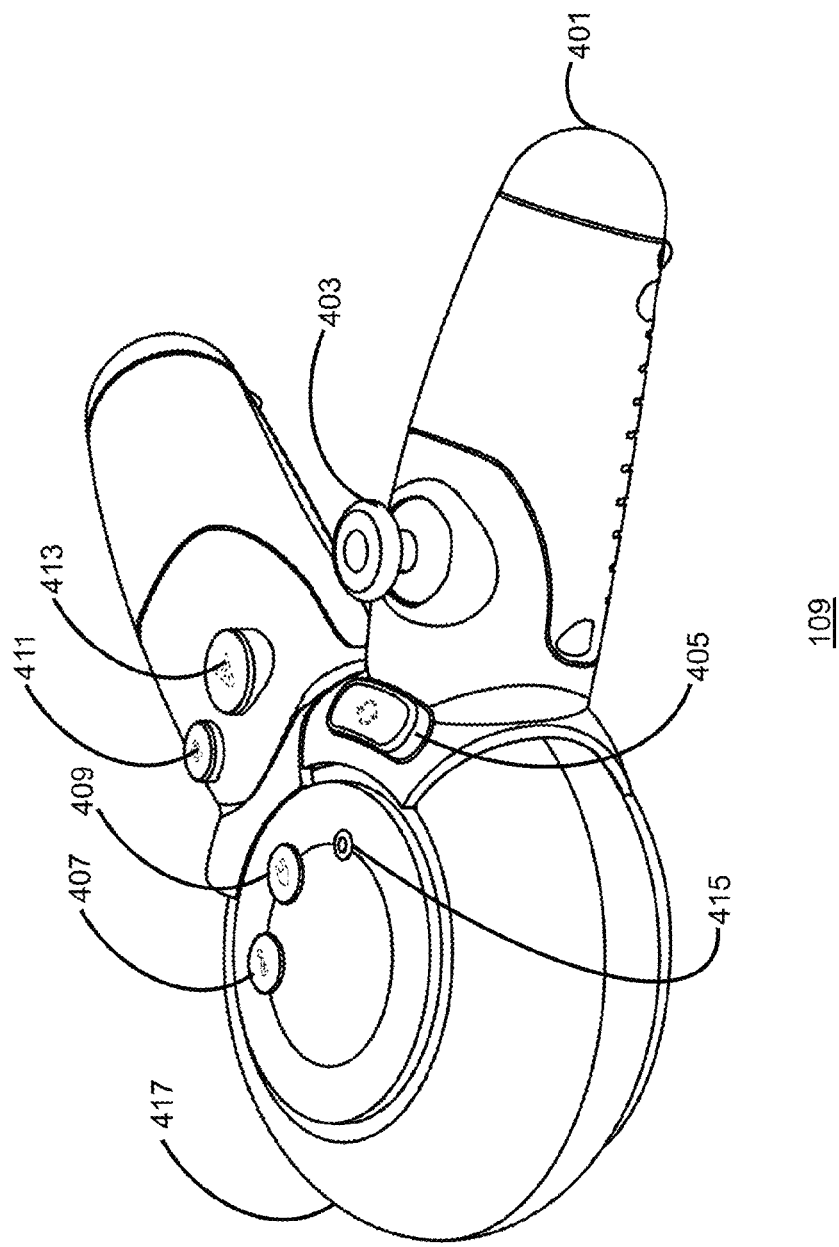

The console 103 may also be coupled with a controller 109. FIGS. 4A and 4B show an exemplary controller 109 that may convertible between a "wand" mode as shown in FIG. 4A and a "V" shape as shown in FIG. 4B. The controller 109 may have a housing 417 and various buttons and controls such as a control stick 403 (e.g., a thumbstick), a transform button 405, a help button 407, a home menu button 409, a controller activity indicator 415, and command buttons 411 and 413.

The controller 109 may have a light 401 that can be used for navigating menu items or images or directing game play on the display 101. In embodiments of the invention the light may be an LED light, however, other lights such as infrared, etc. may be used with embodiments of the invention. There are several advantages to using an LED light. For example, an LED light may clearly indicate to the user that the controller is active and in pointer mode, versus a non-visible light source like infrared. An LED light can also change colors to give gameplay clues (e.g., the light can turn to blue LED color when Cinderella is an active character and purple LED color when Rapunzel is an active character).

Typically systems require a combination of technologies for accurately tracking motion. For example, many systems use a combination of light, a gyroscope, and an accelerometer. Embodiments of the invention allow for a controller and system to only use light emitted from the controller for tracking motion. This provides for a number of advantages such as providing a simpler and more cost efficient system and reduced processing requirements.

There may be two components to light tracking according to embodiments of the invention. One may be camera hardware manipulation and the other may be an optimized for real-time performance software algorithm. The overall system may be based on an assumption that the light emitted from the controller (e.g., the light at the end of a controller/wand) is one of the brightest, if not the brightest, light in the field of view of the camera.

In order to better facilitate the algorithmic portion of the system the camera settings may be adjusted to help isolate the light emitted from the controller (e.g, an LED light) at the hardware level. This may be done by reducing the exposure time of the camera to an extremely short duration. The exposure value may represent line processing time and may be decimal equivalents of the hexadecimal values of the registers that control the camera. The ideal exposure value may be at the low end of the exposure range for the camera. For example, the inventors did some testing with a camera that had an exposure range from about 8 to about 600 and found that when the camera was configured to have an exposure value of 14 they got the best results. The inventors found that if they set the exposure to the minimum value of 8 that it degraded the quality of the image with respect to the light and made it difficult to isolate the light in the image. The exposure value of 14 was chosen empirically as it produced an image that darkened the background and yet still allowed the wand LED to shine through. The effect of reducing the exposure time of the camera has is that bright spots in the field of view may show up clearer than typical background objects. At this point the captured frames from the camera are overall relatively dark with (ideally) just a single bright spot that is the LED. Because there are environmental factors, such as windows with bright sunshine, lamps, overhead lights, specular reflections, etc., the image may need further manipulation, via the underlying algorithm, in order to isolate the LED.

Figure 10:
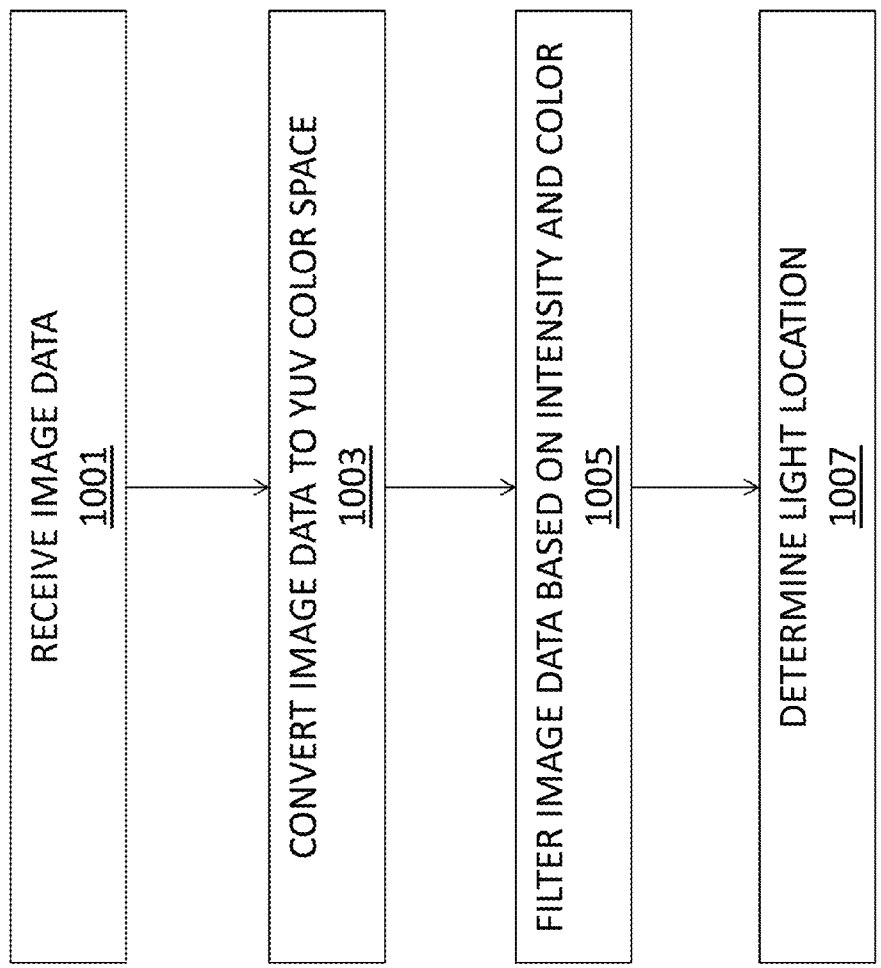
FIGS. 10-14 show flowcharts of methods according to embodiments of the invention.

The light tracking algorithm may use a three phase approach to finding the light: color conversion, filtering based on color and brightness, and finally light (e.g., LED) location detection. Referring to FIG. 10, image data may be received by the system. For example, image data may be received at a computing device such as a console 103 from a camera 105 coupled with the console 103 (1001). Incoming frame buffers, regardless of the original color space they were in, may get converted to a YUV color space (1003). (The Y component determines the brightness of the color (referred to a luminance or luma), while the U and V components determine the color itself (the chroma)). This does two things, it isolates the image intensity (V) on a per pixel basis and places the per pixel color on a two-dimensional grid (YU). From this, the image may be filtered based on the intensity (only "bright" pixels get through) and on the color (1005). For example, the values of intensity may be from 1 to 255. This may indicate a higher interest in the color range of the light than the light itself. This may be due to the fact that with an extremely short exposure duration we may be essentially moving all non-lit background objects as close to black as possible, which carries a brightness of 0. The two-dimensional color range used to filter the images may be based on the color of the LED wand and empirical testing to determine an optimal YU range for the specific wand color. For example, the default range of the UV components of the filter for the green light may be Urange= [184, 254], Vrange=[144, 214]. These values may be calculated by taking an optimal image of the green wand LED, then testing every possible combination of U and V ranges and picking the range combination that provides a maximum number of "lit" pixels. A "lit" pixel is one that makes it through the filtering process, in this case the full YUV filter. There are a variety of colors that may be used as the light on the controller. In a preferred embodiment a green color may be used as a color that is more easily tracked. A specific green color (e.g., a predetermined color) may be used so that the system can better detect that the light is coming from the controller versus another light source.

The resulting image produced from the filtering portion of the algorithm is a binary (e.g., black and white) image representing the location of the specific color and intensity of light of interest. In ideal situations the white in this image is only representative of where the LED wand light originates. In sub-optimal conditions, large amounts of background light that is of similar color and intensity as the wand LED, the white in this image contains erroneous information from this background "noise." From this binary image the location of the largest area of light, presumably the LED wand, may be determined by first finding the largest contour around the white in the image. At this point the contour represents the outline of the LED light, in order to make this more meaningful a circle may be fit to the largest diameter of the contour. The center of the circle may represent the location of the LED light and the area of the circle may represent the area of the LED light that is visible in the current frame buffer, barring occlusion from objects or from the angle of incident between the wand and the camera. Thus the system determines/detects the location of a light emitted from a controller (e.g., the LED location) (1007).

The location of the light emitted from a controller may be used to display a "cursor" on the display (e.g., the location of the light emitted from the controller may be associated with a cursor location on the display), to determine objects with which the user is interacting, to show movement of the "cursor" on the display, etc.

Figure 5:
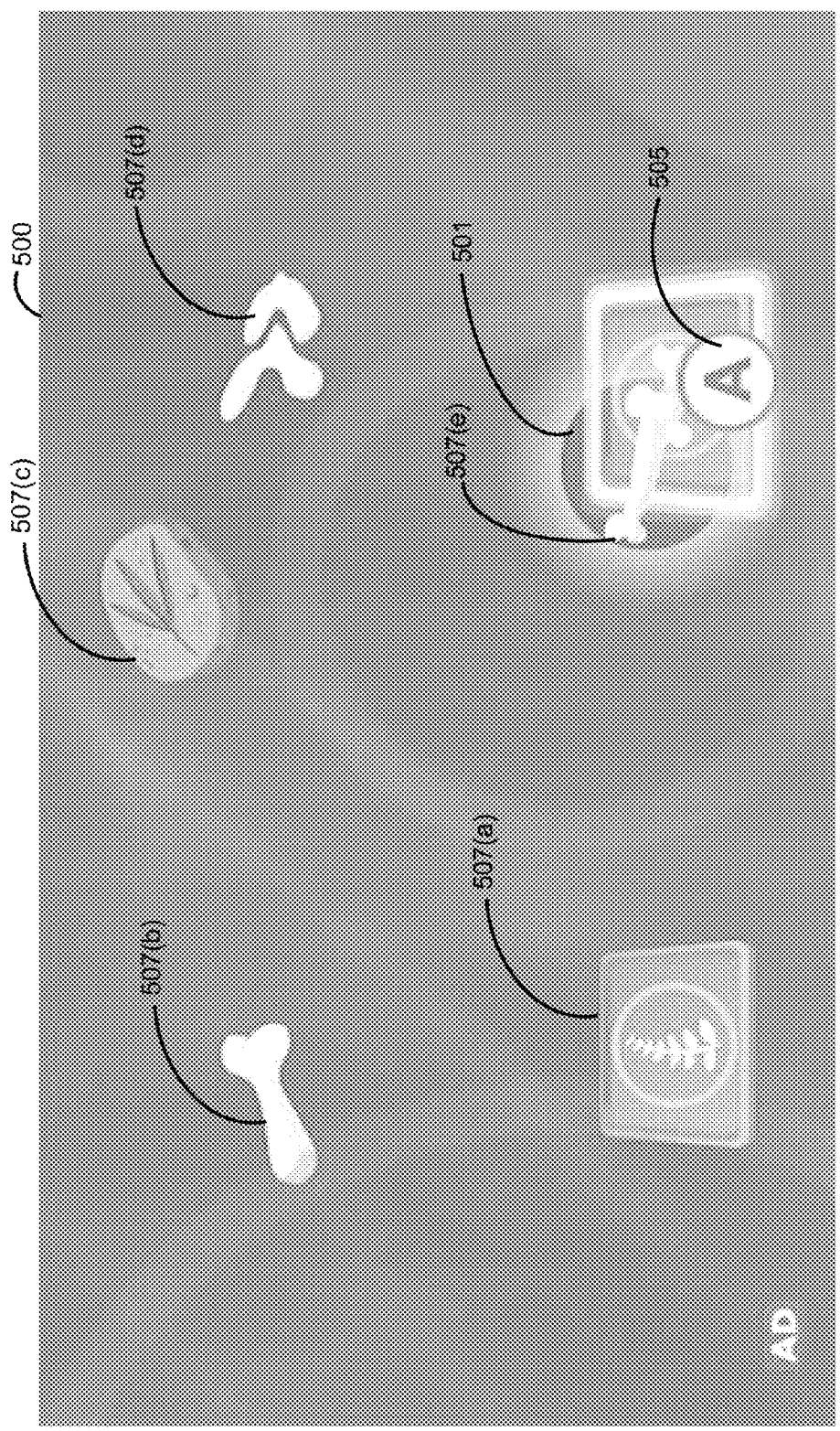
FIG. 5 shows an exemplary screen shot of content that can be used in embodiments of the invention.

FIG. 5 shows a screen shot 500 of content that may be displayed on a display for a user, according to embodiments of the invention. In particular, the screen shot 500 shows a number of items 507(*a*)-507(*e*) that may be selected by a user(s) while interacting with the content on the display. Because a user may be a young child (e.g., age four through seven), he may not have the motor skills to precisely point a cursor or hotspot 501 in the exact location necessary to select an item. Thus, a traditional cursor would not be useful. Accordingly, embodiments of the invention will enable the cursor 501 to snap to menu options or interactable objects such as items 507(*a*)-507(*e*) when the user gets near the object with the cursor 501. In addition, there may be a visual state change in the cursor 105 to reflect the button the user needs to push to select the menu item or interact with the object. For example, the user may be using controller 109 (as shown in FIGS. 4A and 4B) that has two buttons labeled button A 413 and button B 411. When the user points the controller 109 toward the screen and points the cursor 501 near item 507(*e*) the cursor 105 will snap to item 507(*e*) and the letter A (505) will appear to indicate to the user that he should press the letter A button 413 on his controller 109.

Figure 11:
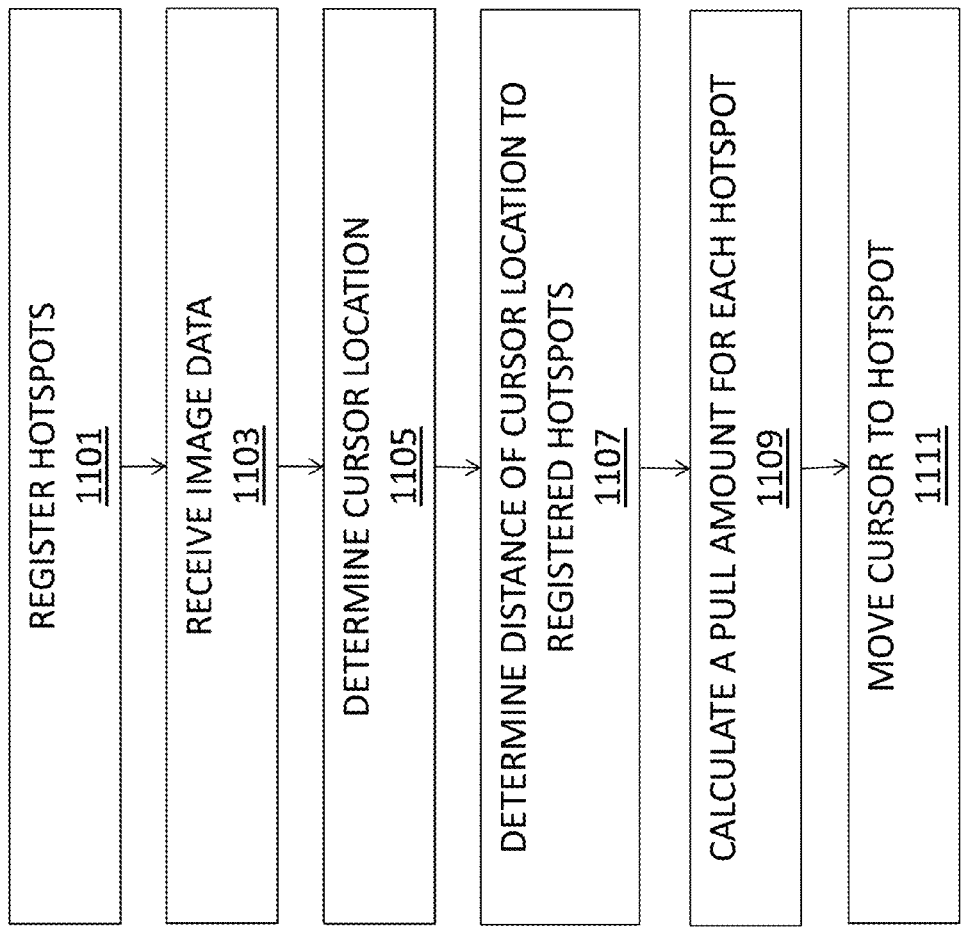

The location of an item (e.g., a menu item or object) may be determined by a computing device such as console 103 coupled with a camera 105. Referring to FIG. 11, to determine the location of an item, hotspot rectangles for buttons or clickable items such as draggable objects etc. may be registered with a hotspot manager (1101). While a user is interacting with a display, the camera may be capturing images of the user (e.g., still, video images, etc.) and/or a light emitted from a controller used by the user. The console may receive image data from the camera (1103) to determine the location of the controller or a light emitted from the controller with respect to an item. The controller (or wand) location may be determined (1105) by an input class that has averaged the controller coordinates to reduce jitter, and may then warp the controller's position with the hotspot manager's hotspots (e.g., a plurality of registered hotspots). This warping may happen by determining the distance of the controller to all the hot spots (1107) and calculating the ratio of the distances of each one with the average distance. A pull amount is calculated for each hotspot and is weighted by a global "strength" amount (1109). For example, the "pull amount" may be adjusted by a global constant that makes the gravity towards the hotspots look nice. It may be a scalar to the amount that is applied to the pull towards each hotspot. This value can be set from code to make it stronger or weaker for different scenes. When there are situations when there are so many hotspots in a scene, this value may be turned to zero, to make it the best GUI experience for the player.

The cursor is then moved (or "snapped") to the correct hotspot position on the display based on the pull amount (1111). In embodiments of the invention the "cursor" may not the same as the controller position; they may be separate. The controller position may be a) smoothed with averaging b) not always exist, and c) invisible to the user. The system may take the controller location and pass that into the Hotspot Manger that knows about where all the hotspots are on the screen. That location may be used to calculate the pull towards each of the hotspots, and then the sum of all the pulls may be multiplied by the global strength constant. The resultant position is where the cursor's screen graphic is placed and it may also be used for hotspot enter/leave and hit detection. As explained above, a visual state change in the cursor 105 may occur to reflect the button the user needs to push to select the menu item or interact with the object.

Figure 6:
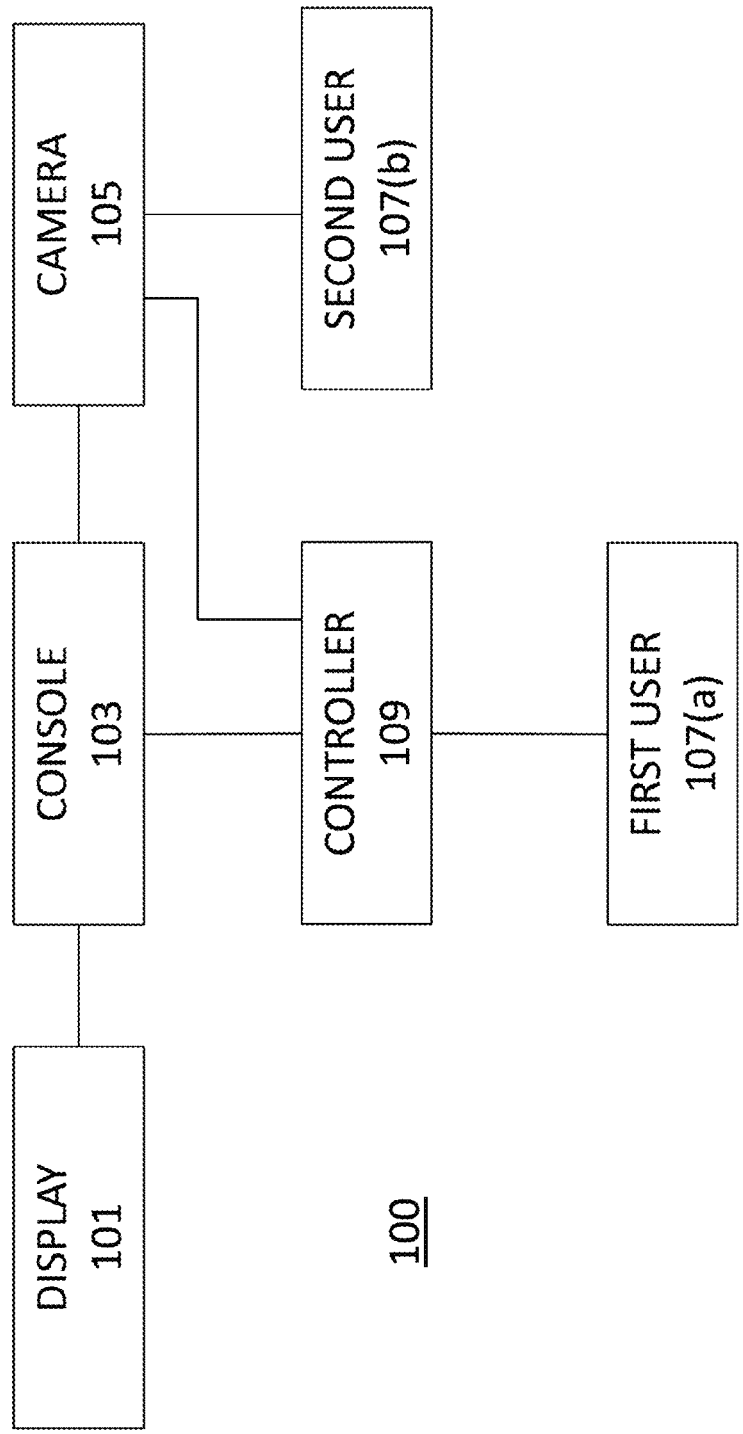
FIG. 6 shows an exemplary system that can be used in embodiments of the invention.

Embodiments of the invention allow for more than one user to be using the system at one time and for each user to be controlling the system using a controller and/or body motion. For example, FIG. 6 shows an exemplary system that can be used in embodiments of the invention that includes a first user 107(*a*) utilizing a controller 109 and a second user 107(*b*) utilizing body motion. Similar to FIG. 1, the system 100 in FIG. 6 includes a display 101 (e.g., a TV, a monitor, etc.) for displaying content to a user(s) 107(*a*) and 107(*b*) (e.g., an interactive game, a visual of the user, etc.). For example, the display 101 may have a screen to display content and also input and output interfaces to connect or be coupled with other components via wired (e.g., firewire, USB, Ethernet, etc.) or wireless (WiFi, Infrared, etc.) connections. The display 101 may be coupled with a console 103 (e.g., a gaming console). The console 103 may be coupled with a camera 105 that captures images and movement of the user(s) 107(*a*) and 107(*b*) and captures/detects a light emitted from a controller 109. The console may be further coupled with a controller 109. Components 101-109 may be coupled together by wired or wireless connections as known in the art.

Embodiments of the invention allow either the first user 107(*a*) or the second user 107(*b*) to control certain aspects of a game or interactive content and then the first user 107(*a*) or the second user 107(*b*) to respond or react to that control. For example, the interactive content displayed on the display 101 may be a snowball game. The first user 107(*a*) may use body motion to collect snowballs shown on the display and throw them at a character controlled by the second user 107(*b*), also shown on the display. The second user 107(*b*) may be utilizing a controller 109 to cause the character to move to dodge the snowball.

Figure 12:
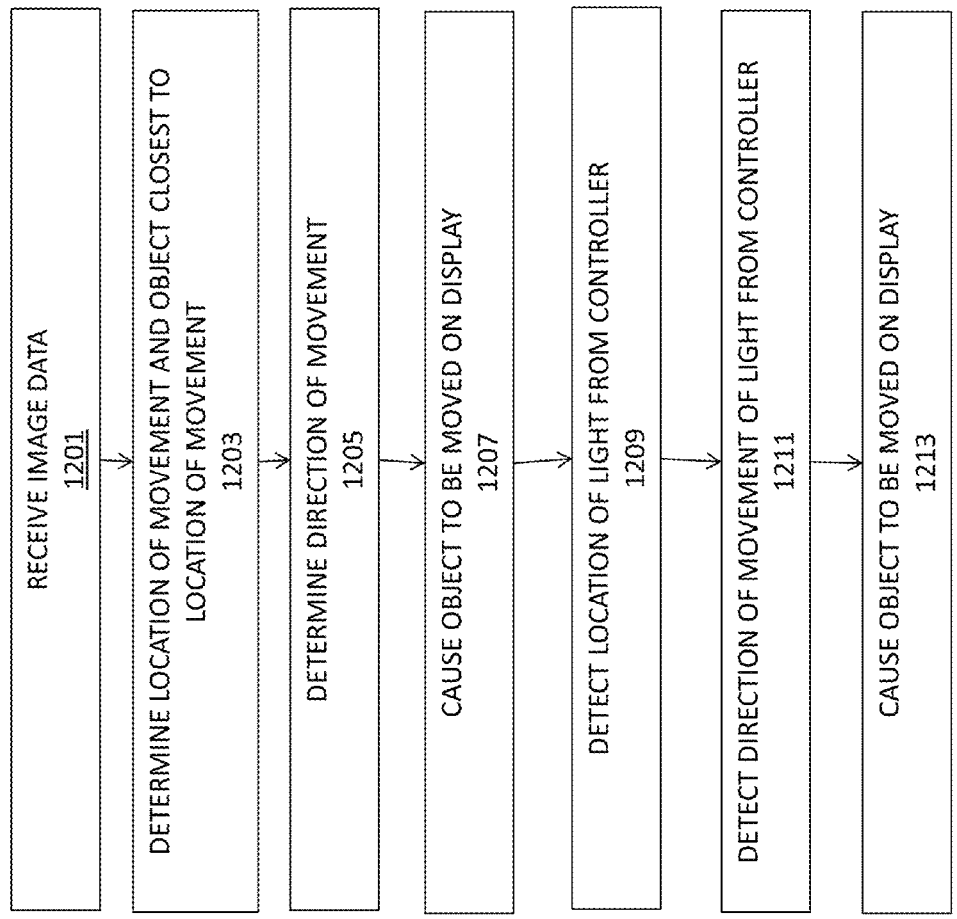

For example, referring to both FIG. 6 and FIG. 12, a computing device such as console 103 coupled with camera 105, may receive image data from the camera 105 (1201). The image data may include image data associated with body motion of a first user 107(*a*). The console 103 may determine the location of the movement and an object closest to the area of movement (1203). The console 103 may also determine the direction of the movement (1205). The console 103 may then cause the object closest to the area of movement to be moved on the display in the direction of the movement (1207). The image data received from the camera 105 may include image data associated with a controller used by a second user 107(*b*). The console 103 may detect the location of the light emitted from the controller (1209), as described above (e.g., detect the LED location of the controller). The console 103 may detect the direction of movement of the light emitted from the controller (1211) and cause an object associated with the second user 107(*b*) to be moved on the display in the direction of the movement (1213).

Figure 7:
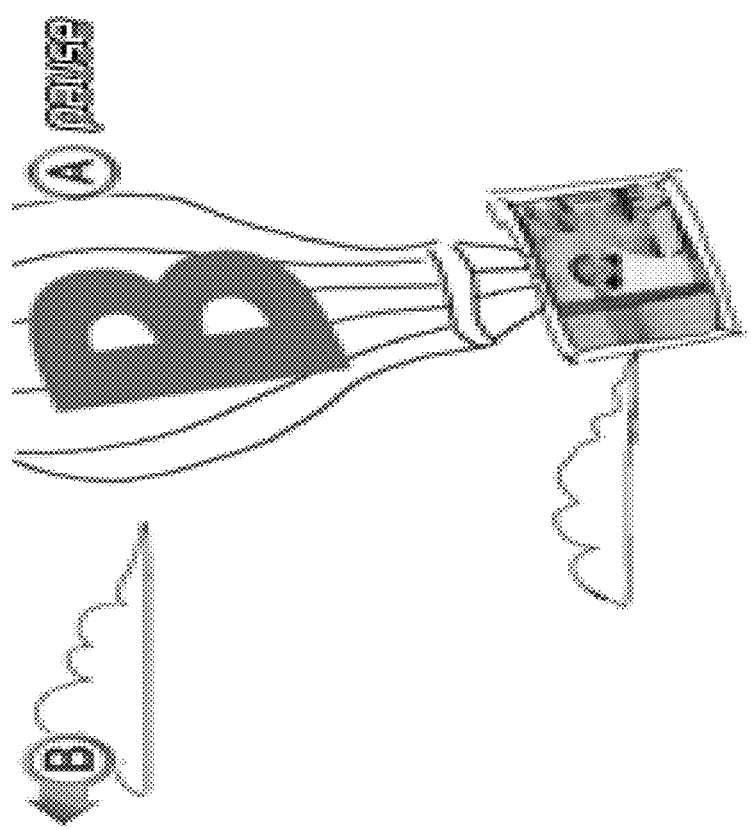
FIG. 7 shows an exemplary screen shot of content that can be used in embodiments of the invention.
Figure 13:
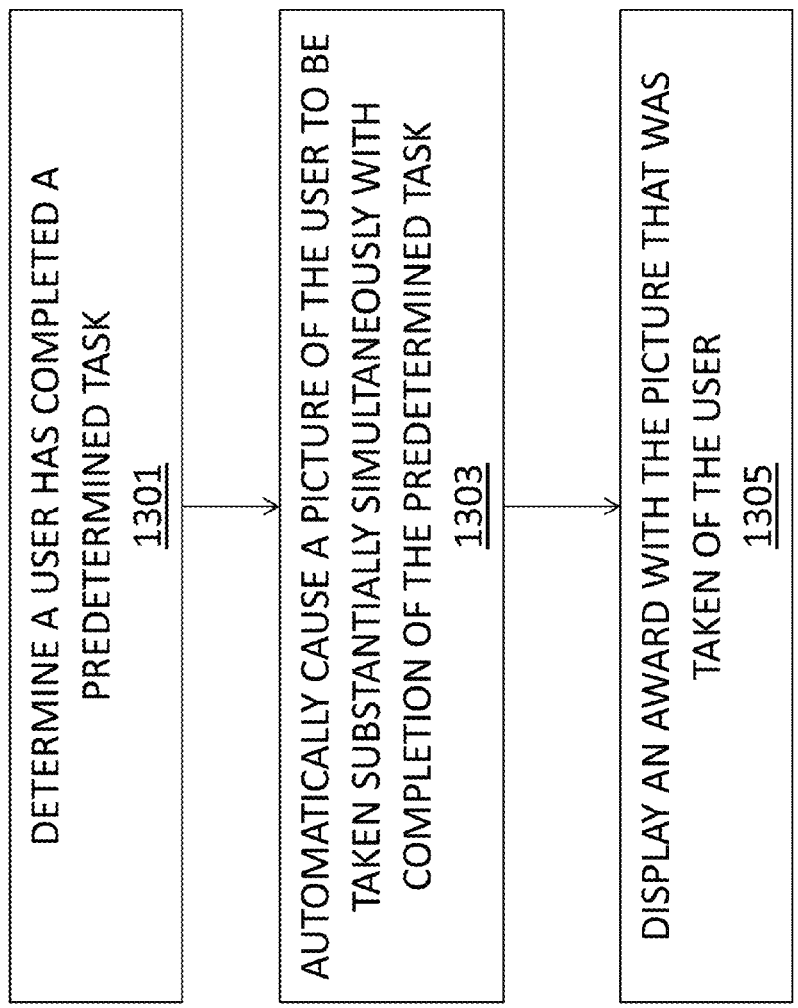

In embodiments of the invention users may earn badges or rewards when completing certain tasks within a content title. For example, a user can earn a badge for answering questions correctly in an alphabet letters game or by doing a correct dance move in a dancing game or by kicking a goal in a soccer game. In embodiments of the invention the system can automatically take photos of the user when the user has completed the certain/predetermined task that is then shown in a badge to show the user that they earned a badge or award. For example, the certain/predetermined task may be when a user scores a goal in a soccer game. As shown in FIG. 13, the system may determine that the user is kicking the goal (1301) and automatically cause a camera to take a photo of the user kicking a goal in a soccer game (1303), e.g., substantially simultaneously with the user completing the task. The user does not need to do anything to cause the picture to be taken (or even be aware that it is being taken). After the game is over or after the goal is made, the system can display the award or badge to the user that shows the user kicking the winning goal (1305). As another example, a photo can be taken when the user is doing a correct dance move and then shown to the user at the end of the game as a reward as shown in FIG. 7.

Figure 8A:
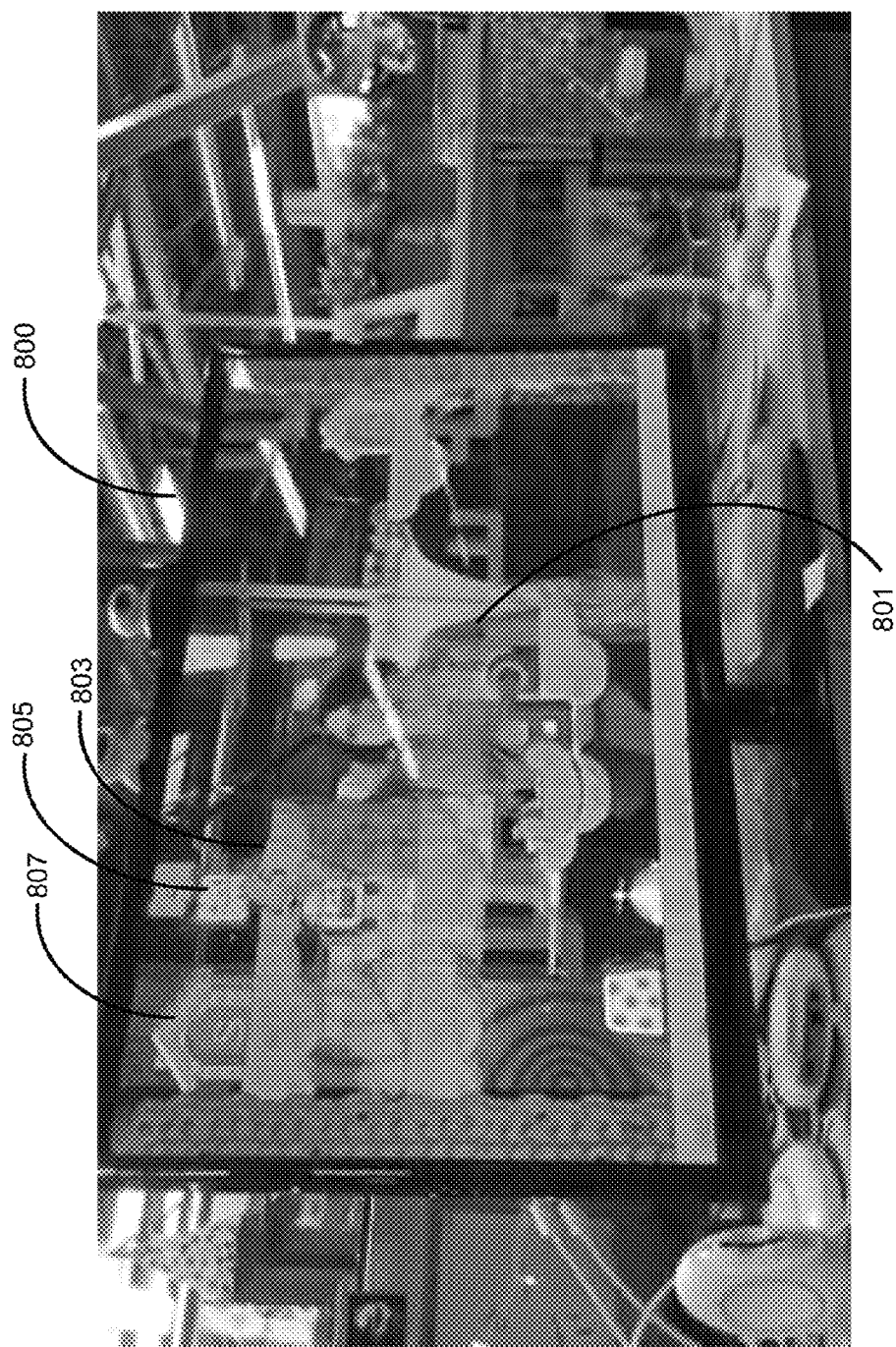
FIGS. 8A and 8B show an exemplary display according to embodiments of the invention.
Figure 8B:
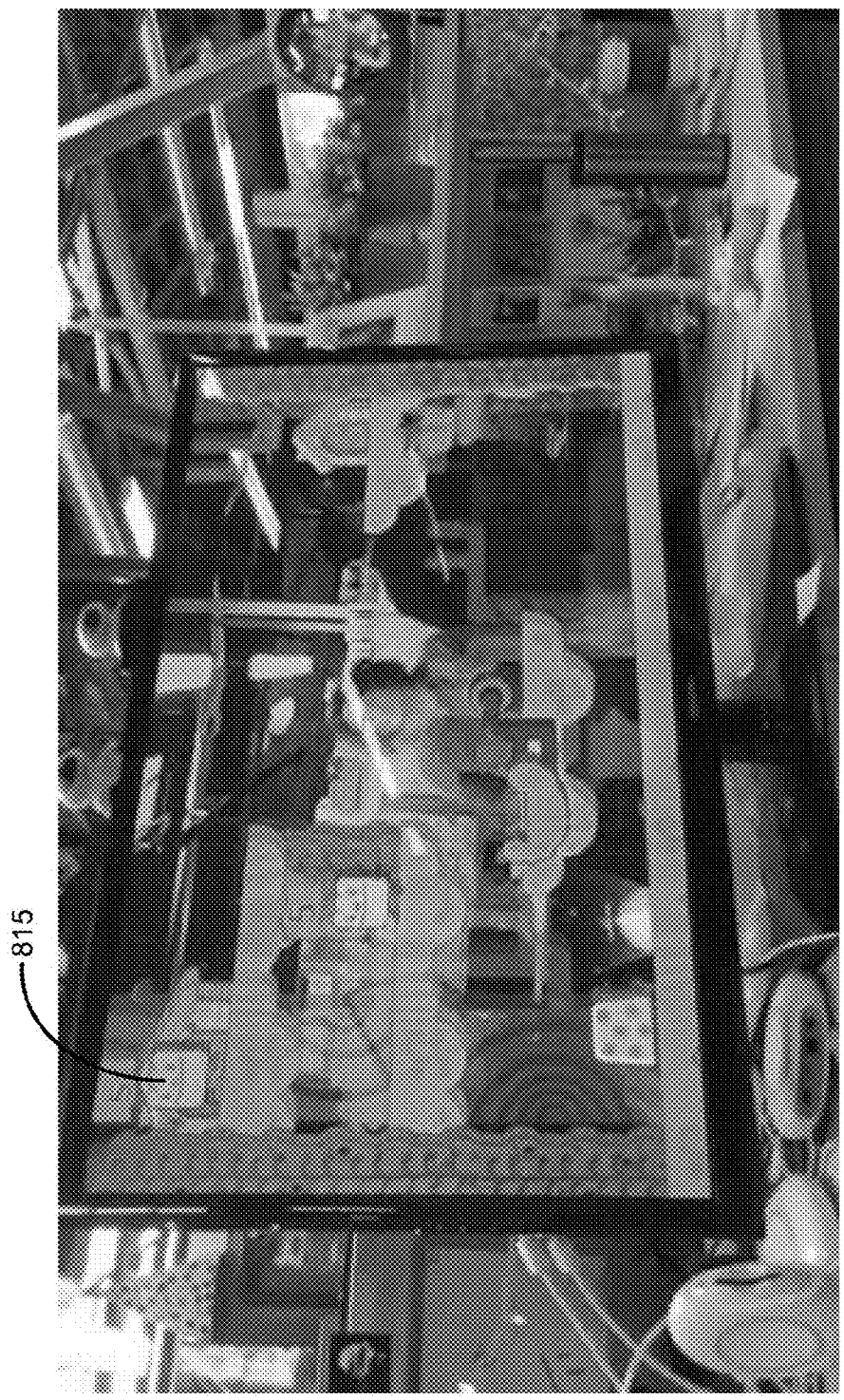

Further, embodiments of the invention allow a user to interact directly with characters in a game. FIGS. 8A and 8B show a game where a user can use body motion to knock the objects into the correct doorway based on the letter that is associated with the object and the doorway. For example, FIG. 8A shows a display 800 with an object 805 that looks like a square critter with various facial expressions, etc. that has the letter "S" associated with it (shown above the critter). The user 801 uses body motion to "tap" the critter 805 into the doorway 807 associated with the letter "S" (shown in the doorway). For example, the user 801 can wave her hand 803 towards the critter 805 in the direction of the doorway 807 as if she was tapping or pushing the critter 805 into the doorway 807. In response, the critter 805 would move into the doorway 807 as shown in 815 of FIG. 8B.

Figure 14:
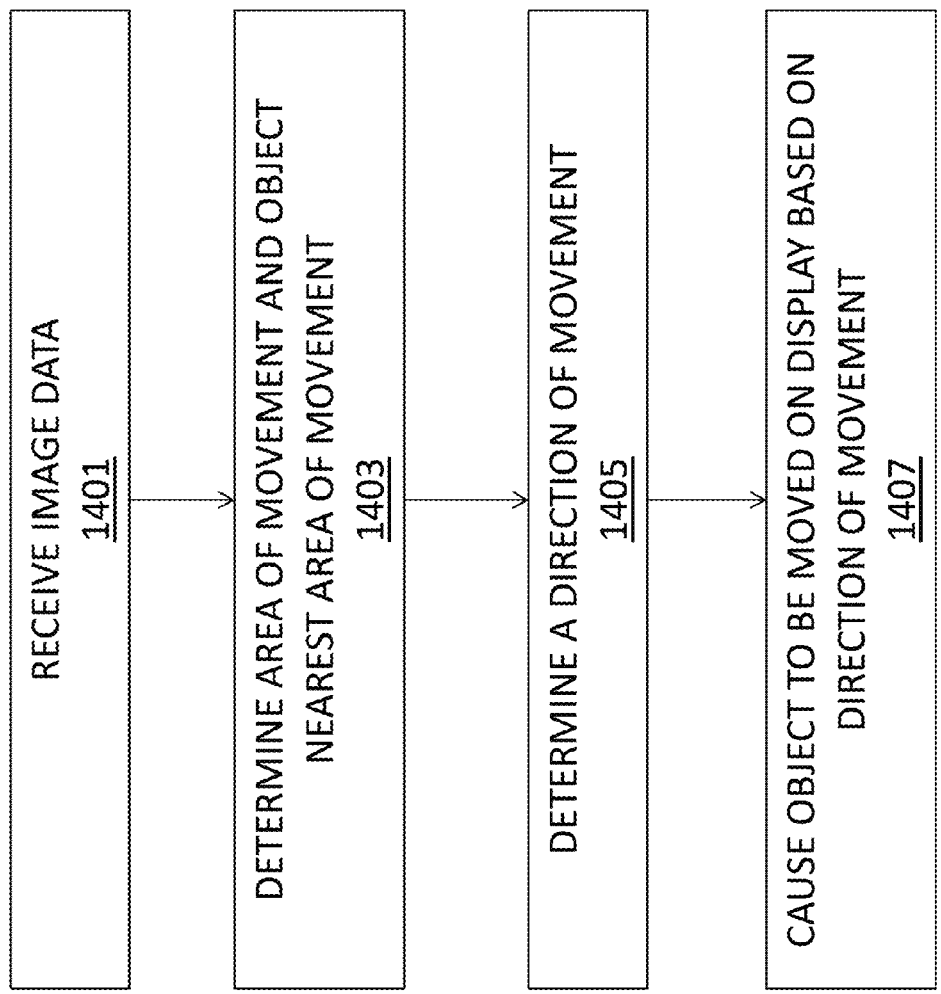

For example, as shown in FIG. 14, a computing device such as console 103 coupled with a camera 105, may receive image data from the camera 105 (1401). The console 103 may determine the location of the movement and the object closest to the area of movement (1403). The console 103 may also determine the direction of the movement (1405). The console 103 may then cause the object closest to the area of movement to be moved on the display in the direction of the movement (1407).

Figure 15:
FIG. 15 shows an exemplary display according to embodiments of the invention.

Embodiments of the invention also allow a user to interact directly with the display in a game or within a content title. For example, FIG. 15 shows a display and a user interacting with a forest biome. A user may interact with items in the forest biome. For example, the user may interact with different plants, animals, etc. The item the user interacts with may react to the interaction (e.g., may animate by moving or speaking) or a fact about the item may be displayed or spoken. To interact with an item, the user may wave her hand near the item. A computing device such as a console 103 coupled with a camera 105, may receive image data from the camera 105. The console 103 may determine the location of the user's movement and the object closest to location of movement. The console 103 may then cause the object to move on the display and/or may cause information related to the object to be spoken or displayed for reading. For example, the user may touch a bird (e.g., make a motion with her hand near the object of the bird on the display) and then the bird may sing in the tree and a fact bubble may be displayed and/or sounded that has a biome fact of the bird.

Thus, the user can see a visual change to the object she interacted with and read or hear information about the object.

Figure 9:
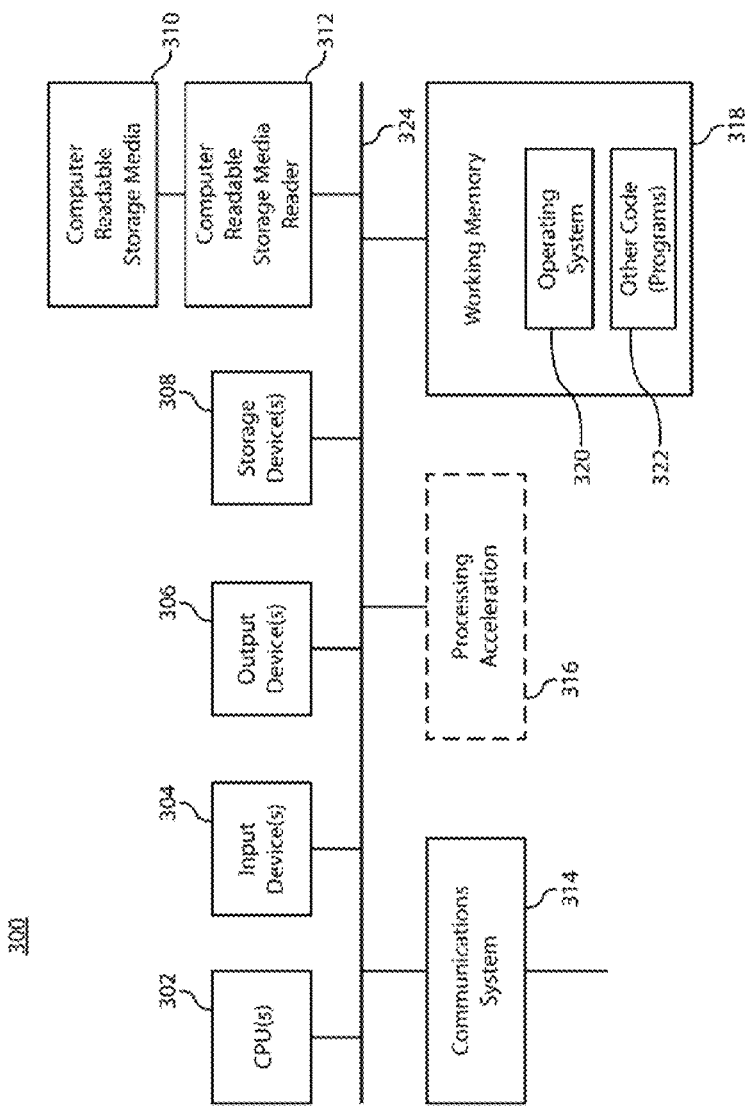
FIG. 9 shows an exemplary computer system that can be used in embodiments of the invention.

Embodiments of the invention may also operate one or more computer systems or apparatuses to facilitate the functions described herein. Any of the elements in embodiments of the invention may use any suitable number of subsystems to facilitate the functions described herein. Examples of such subsystems or components are shown in FIG. 9. FIG. 9 illustrates an exemplary computer system 300, in which various embodiments may be implemented. The system 300 may be used to implement any of the computer systems described above (e.g., console 103, etc.). The computer system 300 is shown comprising hardware elements that may be electrically coupled via a bus 324. The hardware elements may include one or more central processing units (CPUs) 302, one or more input devices 304 (e.g., a mouse, a keyboard, touchpad, etc.), and one or more output devices 306 (e.g., a display device, a printer, etc.). The computer system 300 may also include one or more storage devices 308. By way of example, the storage device(s) 308 may include devices such as disk drives, optical storage devices, solid-state storage device such as a random access memory ("RAM") and/or a read-only memory ("ROM"), which may be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which may include a digital signal processor DSP, a special-purpose processor, and/or the like.

The computer-readable storage media reader 312 may further be connected to a computer-readable storage medium 310, together (and, optionally, in combination with storage device(s) 308) comprehensively representing remote, local, fixed, and/or removable storage devices plus storage media for temporarily and/or more permanently containing, storing, transmitting, and retrieving computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a (non-transitory) computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, at a computing device, image data from a camera;
converting, by the computing device, the image data to a YUV color space;
filtering, by the computing device, the converted image data based on intensity and a predetermined color to produce a filtered image, the filtered image being a binary black and white image; and
determining, by the computing device, a location of light emitted from a controller from the filtered image, wherein determining the location of light emitted from the controller from the filtered image comprises finding the largest contour around the white in the filtered image, and fitting a circle to the largest diameter of the contour.

2. The method of claim 1 wherein the light is an LED light.

3. The method of claim 1 further comprising:
displaying, by the computing device, a cursor associated with the location of the light emitted from the controller, on a display.

4. The method of claim 1 wherein the light is a green color.

5. The method of claim 1 wherein the camera is configured with a reduced exposure time.

6. The method of claim 1 further comprising:
tracking motion of the controller using the light emitted from the controller.

7. The method of claim 6 wherein the motion of the controller is tracked without using a gyroscope.

8. The method of claim 6 wherein the motion of the controller is tracked without using a accelerometer.

9. The method of claim 1 wherein the controller includes two arms that are adjustable between a V-shape configuration and a linear configuration, and wherein the light is emitted from one of the adjustable arms when the controller is configured in the linear configuration.

10. A system comprising:
a camera; and
a computing device coupled with the camera, the computing device comprising:
a processor; and
a non-transitory computer readable medium, coupled with the processor, the non-transitory computer readable medium comprising instructions to be executed by the processor to:
receive image data from the camera;
convert the image data to a YUV color space;
filter the converted image data based on intensity and a predetermined color to produce a filtered image, the filtered image being a binary black and white image; and
determine a location of light emitted from a controller from the filtered image, wherein the location of the light emitted from the controller is determined by finding the largest contour around the white in the filtered image, and fitting a circle to the largest diameter of the contour.

11. The system of claim 10 wherein the camera is configured with a reduced exposure time.

12. The system of claim 10 wherein the light is an LED light.

13. The system of claim 10 wherein the light is a green color.

14. The system of claim 10 wherein the non-transitory computer readable medium further comprises instructions to be executed by the processor to display a cursor associated with the location of the light emitted from the controller.

15. The system of claim 10 wherein the non-transitory computer readable medium further comprises instructions to be executed by the processor to track motion of the controller using the light emitted from the controller.

16. The system of claim 15 wherein the motion of the controller is tracked without using a gyroscope.

17. The system of claim 15 wherein the motion of the controller is tracked without using an accelerometer.

18. The system of claim 10 wherein the controller includes two arms that are adjustable between a V-shape configuration and a linear configuration, and wherein the light is emitted from one of the adjustable arms when the controller is configured in the linear configuration.

19. The system of claim 18 wherein the controller includes a control stick disposed on the adjustable arm that emits the light.

* * * * *